M. TOMASKO & C. M. GASSNER.
CULTIVATOR.
APPLICATION FILED SEPT. 25, 1915.
1,214,095.
Patented Jan. 30, 1917.
2 SHEETS—SHEET 1.
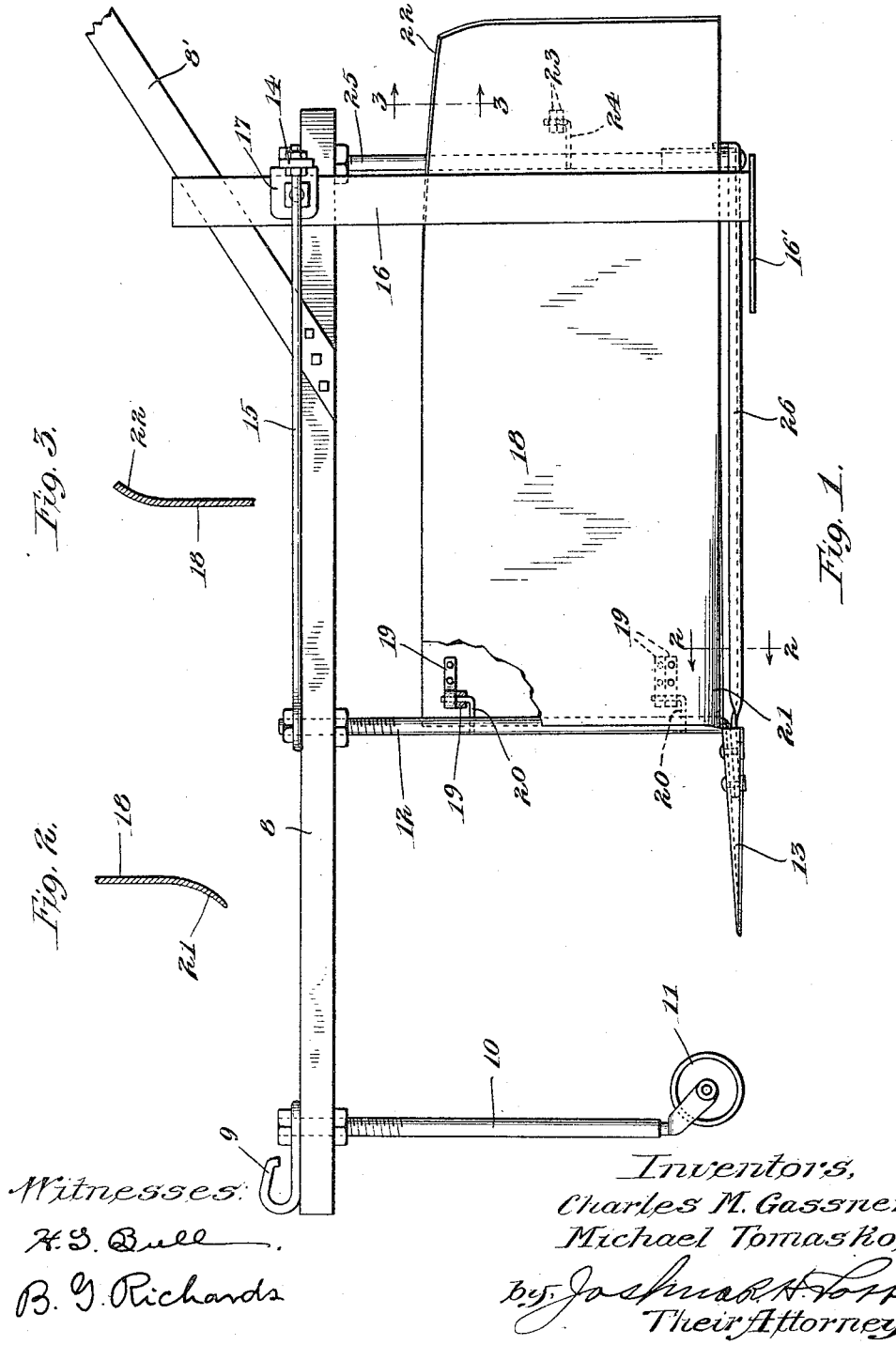
Witnesses:
H. S. Bull
B. Y. Richards
Inventors,
Charles M. Gassner,
Michael Tomasko,
by Joshua R. H. Potts
Their Attorney.

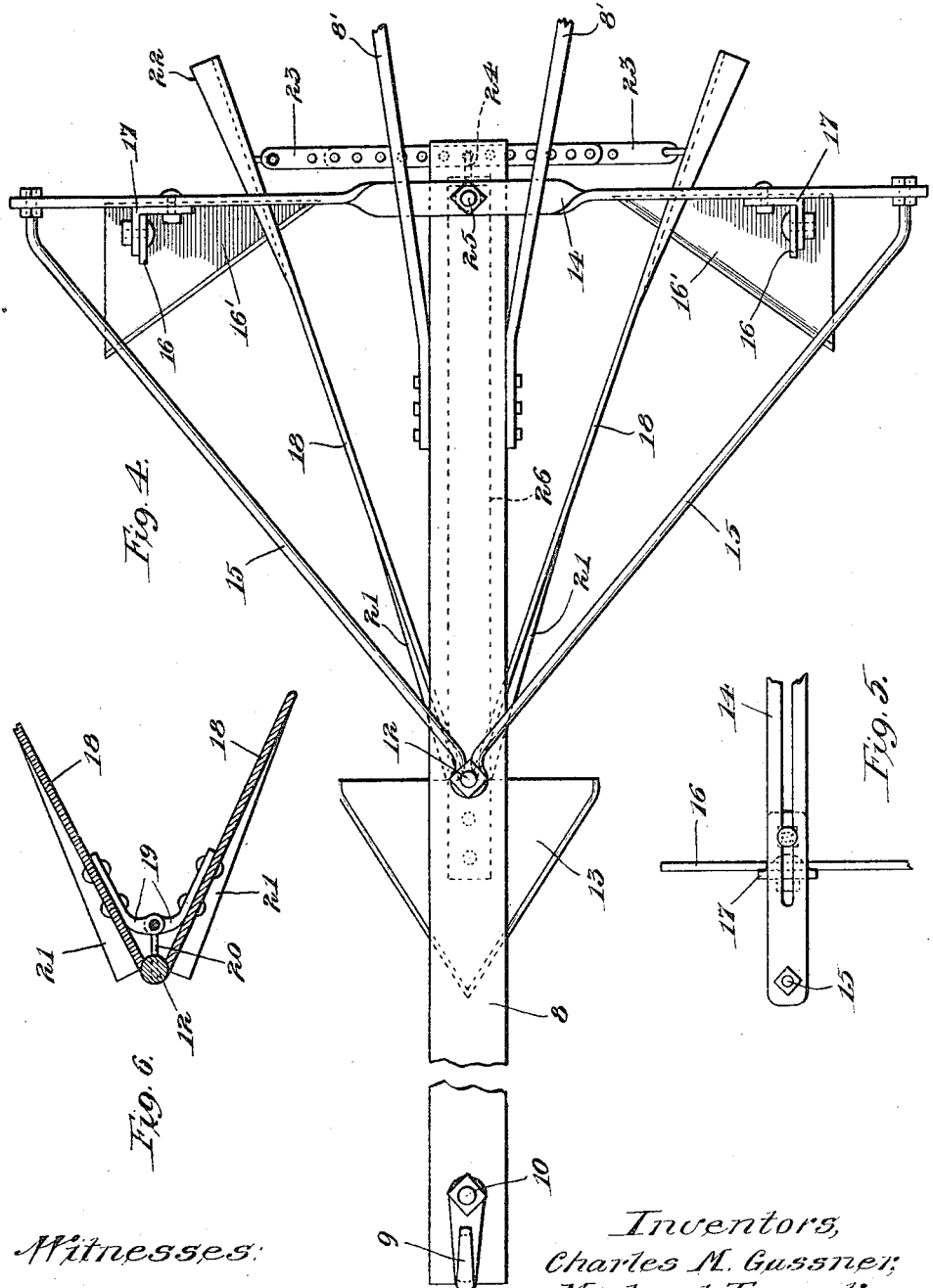

UNITED STATES PATENT OFFICE.

MICHAEL TOMASKO, OF LA FAYETTE, AND CHARLES M. GASSNER, OF MONTICELLO, INDIANA.

CULTIVATOR.

1,214,095.   Specification of Letters Patent.   Patented Jan. 30, 1917.

Application filed September 25, 1915.   Serial No. 52,674.

*To all whom it may concern:*

Be it known that we, MICHAEL TOMASKO and CHARLES M. GASSNER, citizens of the United States, and residents of La Fayette, county of Tippecanoe, and State of Indiana, and of Monticello, county of White, and State of Indiana, respectively, have invented certain new and useful Improvements in Cultivators, of which the following is a specification.

Our invention relates to improvements in cultivators especially adapted for use in cultivating corn, and has for its object the provision of an improved cultivator of this character which is of simple construction and efficient in use.

The invention consists in the combinations and arrangements of parts hereinafter described and claimed.

The invention will be best understood by reference to the accompanying drawings forming a part of this specification, and in which, Figure 1 is a side elevation of a cultivator embodying our invention, Fig. 2, an enlarged section taken on line 2—2 of Fig. 1, Fig. 3, an enlarged section taken on line 3—3 of Fig. 1, Fig. 4, a top plan view of the cultivator, Fig. 5, a detail view of means for mounting one of the cultivator blades, and Fig. 6, a horizontal section taken through the forward portion of spreader members employed in the construction.

The preferred form of construction, as illustrated in the drawings, comprises a suitable frame made up of a central draft beam 8 having a clevis 9 at its forward end for traction purposes and a vertically adjustable threaded rod 10 carrying a swiveled wheel 11 at its lower end. Another vertically adjustable threaded rod 12 is connected with the beam 8 adjacent its central portion and carries a cultivator blade 13 at its lower end, said blade 13 being substantially in the form of an equilateral triangle with one of its apexes positioned forwardly and the two forward edges thereof sharpened, as indicated. A cross bar 14 is arranged across the rear end of the beam 8, and has its ends connected with rod 12 by means of divergent braces 15. Depending arms 16 are secured to laterally adjustable brackets 17 adjustable on the arm 14. Each of the arms 16 carries at its lower end a cultivator blade 16' substantially in the form of a right-angled triangle with the hypotenuse thereof sharpened and positioned at a rearward and inward inclination, as best shown in Fig. 4. Suitable handles 8' are connected with beam 8 for guidance of the cultivator in the usual manner. The arrangement is such that the blades 13 and 16' will be caused to travel under the surface of the earth being cultivated, thus serving to break up the surface of the earth without actually turning the same over and cutting off weeds below the surface. By vertically adjusting wheel 11, the depth at which the blades 13 and 16' will travel under the surface of the earth may be regulated as desired.

Divergent spreader sheet metal blades 18 are provided at their forward ends with perforated brackets 19 adapted to fit over pins 20 secured to rod 12 to effect a pivotal mounting for the forward ends of said spreader members. The spreader members 18 are provided at their lower forward ends with outwardly turned lips 21 and at their rear upward ends with outwardly turned lips 22 to facilitate the action of said spreader members. Perforated bars 23 are hingedly connected with the rear portions of spreader members 18 and arranged to engage a pin 24 secured to a rod 25 depending from the rear end of beam 8. The lower end of rod 25 is connected by a horizontal brace 26 with the lower end of rod 12 to add rigidity to the construction. By this arrangement, it will be observed, that the spreader members 18 may be readily attached or detached from the cultivator and their divergence readily adjusted by means of the bars 23.

The cultivator is designed primarily for cultivating corn although it may be used for other purposes. The corn is cultivated once by means of the blades 13 and 16' and at the next cultivation the blades 16' removed and spreader blades 18 applied. These spreader blades 18 serve to throw the soil loosened by blade 13 over onto the roots of the corn thus forming a trough between the rows of the corn and thoroughly covering the roots thereof. The soil thus thrown over the roots of the corn tends to cause spreading of the roots, thus giving the corn a firmer hold in the ground and the trough between the rows prevents water from standing over the roots of the corn and injuring the same. This is all the cultivating that the crop of corn will require under ordinary circumstances and conditions, and we have found that such treatment with the cultivator set forth, materially increases the yield available from a certain cultivated area.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. A cultivator comprising a draft beam; a threaded vertical rod depending from said draft beam; a cultivator blade on the lower end of said rod; vertical pins at the rear side of said rod; spreader blades provided at their inner forward sides with perforated brackets fitting over said pins; a rod depending from the rear end of said draft beam; a vertical pin supported by said rod; perforated bars pivotally connected with the rear inner sides of said spreader blades and detachably engaging said pin; and a brace connecting the lower ends of said rods, substantially as described.

2. A cultivator comprising a draft beam; a threaded vertical rod depending from said draft beam; a cultivator blade on the lower end of said rod; vertical pins at the rear side of said rod; spreader blades provided at their inner forward sides with perforated brackets fitting over said pins; a rod depending from the rear end of said draft beam; a vertical pin supported by said rod; perforated bars pivotally connected with the rear inner sides of said spreader blades and detachably engaging said pin; a brace connecting the lower ends of said rods; a cross bar at the rear end of said draft beam; divergent braces connecting the outer ends of said bar with said first mentioned rod; hangers laterally adjustable on said cross bar; and cultivator blades on said hangers, substantially as described.

In testimony whereof we have signed our names to this specification in the presence of two subscribing witnesses.

MICHAEL TOMASKO.
CHAS. M. GASSNER.

Witnesses:
Dr. FRANK P. HUNTER,
C. KEIFEURATH.

Copies of this patent may be obtained for five cents each, by addressing the "Commissioner of Patents, Washington, D. C."